United States Patent
Delaloye et al.

(10) Patent No.: US 7,725,236 B2
(45) Date of Patent: *May 25, 2010

(54) MANEUVER BASED AIRCRAFT GAS TURBINE ENGINE SPEED CONTROL

(75) Inventors: Jim E. Delaloye, Mesa, AZ (US); Mike W. Rettler, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 466 days.

This patent is subject to a terminal disclaimer.

(21) Appl. No.: 11/707,703

(22) Filed: Feb. 15, 2007

(65) Prior Publication Data

US 2009/0099750 A1 Apr. 16, 2009

(51) Int. Cl.
*G06F 19/00* (2006.01)
(52) U.S. Cl. ............................ 701/100; 184/6.2; 184/6.1
(58) Field of Classification Search .................. 701/100; 184/6.1, 6.11
See application file for complete search history.

(56) References Cited

U.S. PATENT DOCUMENTS

| 3,886,733 | A | * | 6/1975 | Connell ..................... 60/39.48 |
| 4,284,174 | A | | 8/1981 | Salvana et al. |
| 4,468,924 | A | | 9/1984 | Moore |
| 4,531,358 | A | | 7/1985 | Smith |
| 4,717,000 | A | | 1/1988 | Waddington et al. |
| 4,947,639 | A | | 8/1990 | Hibner et al. |
| 4,983,051 | A | | 1/1991 | Hibner et al. |
| 5,048,285 | A | | 9/1991 | Schmitt et al. |
| 5,107,674 | A | | 4/1992 | Wibbelsman et al. |
| 5,165,845 | A | | 11/1992 | Khalid |
| 5,315,819 | A | | 5/1994 | Page et al. |
| 5,344,101 | A | | 9/1994 | Francois |
| 6,035,629 | A | | 3/2000 | Hilgeman et al. |
| 6,282,882 | B1 | | 9/2001 | Dudd, Jr. et al. |
| 6,808,141 | B2 | | 10/2004 | Bretscher et al. |
| 6,881,027 | B2 | | 4/2005 | Klaass et al. |
| 6,895,325 | B1 | | 5/2005 | Munson, Jr. |
| 7,367,193 | B1 | * | 5/2008 | Thompson ................... 60/773 |
| 2001/0047647 | A1 | * | 12/2001 | Cornet ..................... 60/39.02 |
| 2006/0054406 | A1 | | 3/2006 | Delaloye |

* cited by examiner

*Primary Examiner*—Mark Hellner
*Assistant Examiner*—Helal A Algahaim
(74) *Attorney, Agent, or Firm*—Ingrassia Fisher & Lorenz, P.C.

(57) ABSTRACT

A system and method for controlling the rotational speed of a gas turbine engine in an aircraft includes appropriate devices and processes for determining a pressure of lubricant supplied to the turbine engine, and for determining a maneuver state of the aircraft. The rotational speed of the gas turbine engine is controlled based at least partially on the determined pressure and the determined maneuver state. Thus, if the aircraft is in a maneuver state that may cause a reduction or loss of lubricant to the gas turbine engine, the rotational speed of the gas turbine engine can be reduced to a magnitude sufficient to increase turbomachine tolerance to the reduced or no lubricant flow.

3 Claims, 1 Drawing Sheet

MANEUVER BASED AIRCRAFT GAS TURBINE ENGINE SPEED CONTROL

STATEMENT REGARDING FEDERALLY SPONSORED RESEARCH OR DEVELOPMENT

This invention was made with Government support under Contract No. N00019-02-C-3002, awarded by the U.S. Navy. The Government has certain rights in this invention.

TECHNICAL FIELD

The present invention relates to gas turbine engine control and, more particularly, to a system and method for controlling an aircraft gas turbine engine speed based partially on aircraft maneuver status and lubricant supply pressure.

BACKGROUND

Aircraft may include various types of turbomachines to implement various functions. For example, many aircraft include turbomachines to function as the main propulsion engines. The main propulsion engines, in many aircraft, not only provide propulsion for the aircraft, but may also be used to drive various other rotating components such as, for example, generators, compressors, and pumps, to thereby supply electrical and/or pneumatic power. However, when an aircraft is on the ground, its main engines may not be operating. Moreover, in some instances the main propulsion engines may not be capable of supplying the power needed for propulsion as well as the power to drive these other rotating components. Thus, many aircraft include one or more additional turbomachines to function as auxiliary power units (APUs). The APUs, when included and operational, supplement the main propulsion engines in providing electrical and/or pneumatic power. An APU may also be used to start the propulsion engines.

No matter the function of an aircraft turbomachine, it is typically supplied with lubricant from a lubrication supply system, to lubricate various components within the turbomachine. Many of these components, such as main shaft bearings, cannot tolerate relatively long periods of lubricant interrupt. Thus, because aircraft may experience various maneuver conditions within the aircraft flight envelope, some of which may be relatively extreme for certain aircraft, the lubrication supply systems in aircraft are typically designed to maintain adequate lubricant flow to the turbomachines throughout the flight envelope.

Various methods have been and are currently employed to maintain adequate lubricant flow throughout an aircraft's flight envelope. These methods include the use of accumulators, oil-mist systems, check valves, and movable/flexible oil pickup tubes, just to name a few. Although generally safe, reliable, and robust, these methods do present certain drawbacks. For example, these methods can be relatively complex, heavy, and costly to implement.

Hence, there is a need for a system and method of improving aircraft turbomachine tolerance to at least momentary low or no lubricant flow that is not too expensive, complex, and/or heavy. The present invention addresses at least this need.

BRIEF SUMMARY

The present invention provides a system and method of improving aircraft turbomachine tolerance to at least momentary low or no lubricant flow.

In one embodiment, and by way of example only, an aircraft turbine engine control system includes a gas turbine engine and an engine control unit. The gas turbine engine is adapted to receive a flow of fuel and a flow of lubricant at a lubricant pressure, and is configured, at least upon ignition of the fuel, to rotate at a rotational speed. The engine control unit is in operable communication with the gas turbine engine and is configured to receive a lubricant pressure signal representative of the lubricant pressure, and one or more flight maneuver signals representative of one or more aircraft maneuvering parameters. The engine control unit is operable to control the rotational speed of the gas turbine engine based at least partially on the lubricant pressure signal and the one or more flight maneuver signals.

In another exemplary embodiment, an aircraft turbine engine control system includes a gas turbine engine, a flight computer, and an engine control unit. The gas turbine engine is adapted to receive a flow of fuel and a flow of lubricant at a lubricant pressure, and is configured, at least upon ignition of the fuel, to rotate at a rotational speed. The flight computer is configured to receive a plurality of airframe sensor signals that are each representative of an aircraft maneuvering parameter. The flight computer is further configured, in response to the plurality of airframe sensor signals, to supply one or more flight maneuver signals. The engine control unit is in operable communication with the gas turbine engine and the flight computer and is configured to receive a lubricant pressure signal representative of the lubricant pressure and the one or more flight maneuver signals. The engine control unit is operable to control the rotational speed of the gas turbine engine based at least partially on the lubricant pressure signal and the one or more flight maneuver signals.

In yet another exemplary embodiment, a method of controlling gas turbine engine rotational speed in an aircraft includes determining a pressure of lubricant supplied to the turbine engine, and determining a maneuver state of the aircraft. The rotational speed of the gas turbine engine is controlled based at least partially on the determined pressure and the determined maneuver state.

Other independent features and advantages of the preferred turbine engine speed control system and method will become apparent from the following detailed description, taken in conjunction with the accompanying drawings which illustrate, by way of example, the principles of the invention.

DETAILED DESCRIPTION OF A PREFERRED EMBODIMENT

Figure 1:
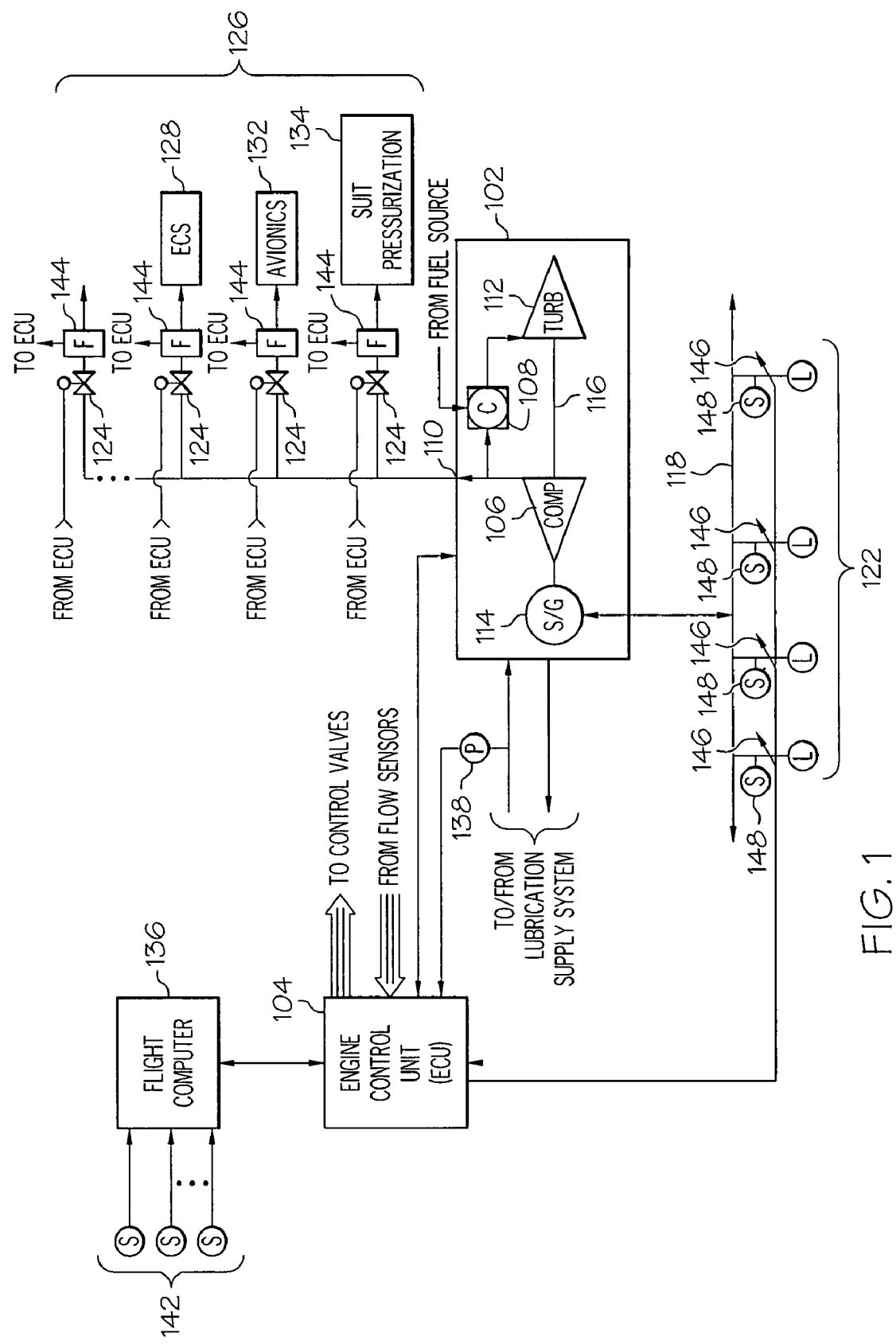
FIG. 1, which is the sole figure, is a schematic diagram of an aircraft gas turbine engine control system according to an exemplary embodiment of the present invention.

The following detailed description is merely exemplary in nature and is not intended to limit the invention or its application and uses. Furthermore, there is no intention to be bound by any theory presented in the preceding background or the following detailed description. In this regard, although the system is depicted and described as supplying lubricant to a turbomachine, it will be appreciated that the invention is not so limited, and that the system and method described herein may be used to supply lubricant to any one of numerous airframe mounted rotating machines.

With reference now to FIG. 1, a schematic diagram of an exemplary aircraft turbomachine system 100 is depicted, and includes a turbomachine 102 and an engine control unit 104.

The turbomachine 102 includes a compressor 106, a combustor 108, a turbine 112, and a starter-generator 114. During operation of the turbomachine 102, the compressor 106 draws in ambient air, compresses the ambient air, and supplies the compressed air to both the combustor 108 and, in the depicted embodiment, to a bleed air outlet port 110. The combustor 108 receives the compressed air from the compressor 106, and also receives a flow of fuel from a non-illustrated fuel source. The fuel and compressed air are mixed within the combustor 108, and are ignited to produce relatively high-energy combustion gas, which is supplied to the turbine 112.

The high-energy combustion gas from the combustor 108 expands through the turbine 112, impinging on non-illustrated turbine blades and causing the turbine 112 to rotate. The turbine 112 includes an output shaft 116 that drives the compressor 106. Moreover, as will now be discussed, depending on the mode in which the turbomachine is operating, the turbine 112, via the output shaft 116, may also drive the starter-generator 114, or alternatively the turbine 112 may be driven by the starter-generator 114.

The starter-generator 114 is configured to be selectively operated in either a motor mode or a generator mode. In the motor mode, the starter-generator 114 receives electrical power from an electrical power source, such as a power bus 118, which causes the starter-generator 114 to rotate and supply mechanical output power to, for example, the turbine 112 and compressor 106. In the generator mode, the starter-generator 114 receives mechanical input power from, for example, the turbine 112 and generates electrical power, which is supplied to, for example, the power bus 118. It will thus be appreciated that the starter-generator 114, when operating in the motor mode, may be used to start the turbomachine 102 and, when operating in the generator mode, may be used to supply electrical power to the power bus 118.

As FIG. 1 additionally depicts, a plurality of electrical loads 122 are coupled to, and receive electrical power from, the power bus 118. The electrical power supplied to the electrical loads 122 may be individually controlled by the engine control unit 104. More specifically, and as will be described in more detail further below, the engine control unit 104 is configured to selectively control the electrical power supplied to one or more of the electrical loads 122 based upon various signals that are supplied to the engine control unit 104.

The compressed air that supplied to the bleed air outlet port 110 is directed, via a plurality of control valves 124 and appropriate piping, to various pneumatic loads 126. Although these pneumatic loads may vary, in the depicted embodiment these pneumatic loads include the aircraft environmental control system 128, aircraft avionics cooling system 132, and a flight crew suit pressurization system 134, just to name a few. The control valves 124 are each coupled to, and receive valve control signals from, the engine control unit 104. In response to the valve control signals, the control valves 124 move to a commanded position, to thereby control the flow of bleed air to the associated pneumatic load 126. More specifically, and as will be also described in more detail below, the engine control unit 104 is configured to selectively control the position of the control valves 124, and thus the bleed air flow to the pneumatic loads, based upon various signals that are supplied to the engine control unit 104.

The engine control unit 104 is in operable communication with, and controls and regulates the operation of, the turbomachine 102. In particular, the engine control unit 104 receives various signals from the turbomachine 102 that are representative of turbomachine operation and, in response to these signals, controls turbomachine operation. The engine control unit 104 is also in operable communication with, and receives one or more flight maneuver signals from, a flight computer 136, and is in operable communication with, and receives a lubricant pressure signal from, a pressure sensor 138. As will be described in more detail further below, the engine control unit 104 controls the rotational speed of the turbomachine 102 based at least partially on these signals.

The flight computer 136 is in operable communication with, and receives sensor signals from, a plurality of airframe sensors 142. The airframe sensors 142 are each configured to sense an aircraft maneuvering parameter and supply a sensor signal representative thereof. The flight computer 136, in response to the sensor signals, supplies the flight maneuver signals to the engine control unit 104. The flight maneuver signals supplied by the flight computer 136 are representative of the sensed aircraft maneuvering parameters. It will be appreciated that the aircraft maneuvering parameters sensed may vary. However, some non-limiting examples of the aircraft maneuvering parameters include aircraft attitude, aircraft altitude, aircraft acceleration vector, aircraft velocity vector, and aircraft flight mode.

The pressure sensor 138 is configured to sense the pressure of the lubricant that is supplied to the turbomachine 102, and to supply the lubricant pressure signal to the engine control unit 104. The lubricant is supplied to the turbomachine 102 from a non-illustrated lubrication supply system. The lubrication supply system preferably includes one or more supply pumps that supply the lubricant to the turbomachine 102 at a lubricant pressure. The lubricant pressure signal supplied from the pressure sensor 138 can be used as an indication of little or no lubrication flow to the turbomachine 102.

As was noted above, the engine control unit 104, based at least partially on the one or more flight maneuver signals and the pressure signal, controls the rotational speed of the turbomachine 102. More specifically, the engine control unit 104, in response to the one or more flight maneuver signals, determines the maneuver state of the aircraft, and in response to the pressure signal, determines if the lubricant pressure is less than a predetermined pressure value. If the engine control unit 104 determines that aircraft is in a predetermined maneuver state and that the lubricant pressure is less than the predetermined pressure value, the engine control unit 104 will reduce the rotational speed of the turbomachine 102. The rotational speed to which the engine control unit 104 reduces the turbomachine 102 may vary depending, for example, on the particular maneuver state of the aircraft and the lubricant pressure. However, the engine control unit 104 is configured to reduce the rotational speed sufficient to increase turbomachine 102 tolerance to the reduced or no lubricant flow.

It will be appreciated that the predetermined maneuver state may be one of a plurality of predetermined maneuver states stored, for example, in a non-illustrated memory. Although the predetermined maneuver states may vary, such maneuver states are preferably at least those could result in reduced or no lubrication flow to the turbomachine 102. It will additionally be appreciated that the predetermined pressure value may vary, but is selected to be sufficiently indicative of a reduction or loss in lubricant pressure.

As was mentioned above, the engine control unit 104 is also in operable communication with, and supplies valve control signals to, the control valves 124. The valve control signals, as was also mentioned above, move the control valves 124 to control the flow of bleed air to the various pneumatic loads 126. The engine control unit 104 is also configured to supply the valve control signals to each of the control valves 124 based, at least in part, on the one or more flight maneuver signals and the pressure signal. That is, in addition to reducing turbomachine rotational speed, the engine control unit 104 may also reduce or stop bleed air flow to one or more of the pneumatic loads if the aircraft is in a predetermined maneuver state and lubricant pressure is less than the predetermined pressure value. A flow sensor 144 is disposed downstream of each of the control valves 124. Each flow sensor 144 is configured to sense the flow of bleed air being supplied to a pneumatic load 126, and supply a feedback flow signal representative thereof to the engine control unit 104. It will be appreciated that each flow sensor 144 may be disposed upstream of the control valve 124 if needed or desired. It will additionally be appreciated that reducing the bleed air load on the turbomachine 102 will also reduce the lubrication and cooling needs of the turbomachine.

As FIG. 1 also depicts, the engine control unit 104 the control unit is in operable communication with a plurality of electrical power control devices 146. The electrical power control devices 146, which may be configured as breakers, switches, or variable resistance or reactance type devices, are each responsive to control signals supplied from the engine control unit 104 to either controllably vary or completely prevent electrical power supply to the associated electrical load 122. The engine control unit 104 is configured to supply the control signals to each of the electric power control devices 146 based, at least in part, on the one or more flight maneuver signals and the pressure signal. That is, in addition to reducing turbomachine rotational speed and reducing or stopping bleed air flow to one or more of the pneumatic loads, the engine control unit 104 may also reduce or prevent electrical power being supplied to one or more of the electrical loads 122 if the aircraft is in a predetermined maneuver state and lubricant pressure is less than the predetermined pressure value. An electrical sensor 148 is associated with each electric power control device 146, and each is configured to sense one or more parameters representative of the electrical power being supplied to an electrical load 122, and supply a feedback electrical load signal representative thereof to the engine control unit 104. It will be appreciated that reducing the electrical load on the turbomachine 102, similar to reducing the bleed air load, will also reduce the lubrication and cooling needs of the turbomachine.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method of controlling a rotational speed of a gas turbine engine in an aircraft, the method comprising the steps of:
    determining a pressure of lubricant supplied to the gas turbine engine;
    determining a maneuver state of the aircraft;
    controlling the rotational speed of the gas turbine engine based at least partially on the determined pressure and the determined maneuver state; and
    reducing the rotational speed of the gas turbine engine upon determining that (i) the determined maneuver state is a predetermined maneuver state and (ii) the determined pressure is less than a predetermined pressure value.

2. The method of claim 1, further comprising:
    supplying a flow of bleed air from the gas turbine engine to one or more pneumatic loads; and
    controlling the flow of bleed air to the one or more pneumatic loads based at least partially on the determined pressure and the determined maneuver state.

3. The method of claim 1, further comprising:
    supplying electrical power from the gas turbine engine to one or more electrical loads; and
    controlling the electrical power supplied to the one or more electrical loads based at least partially on the determined pressure and the determined maneuver state.

* * * * *